Figure 5:
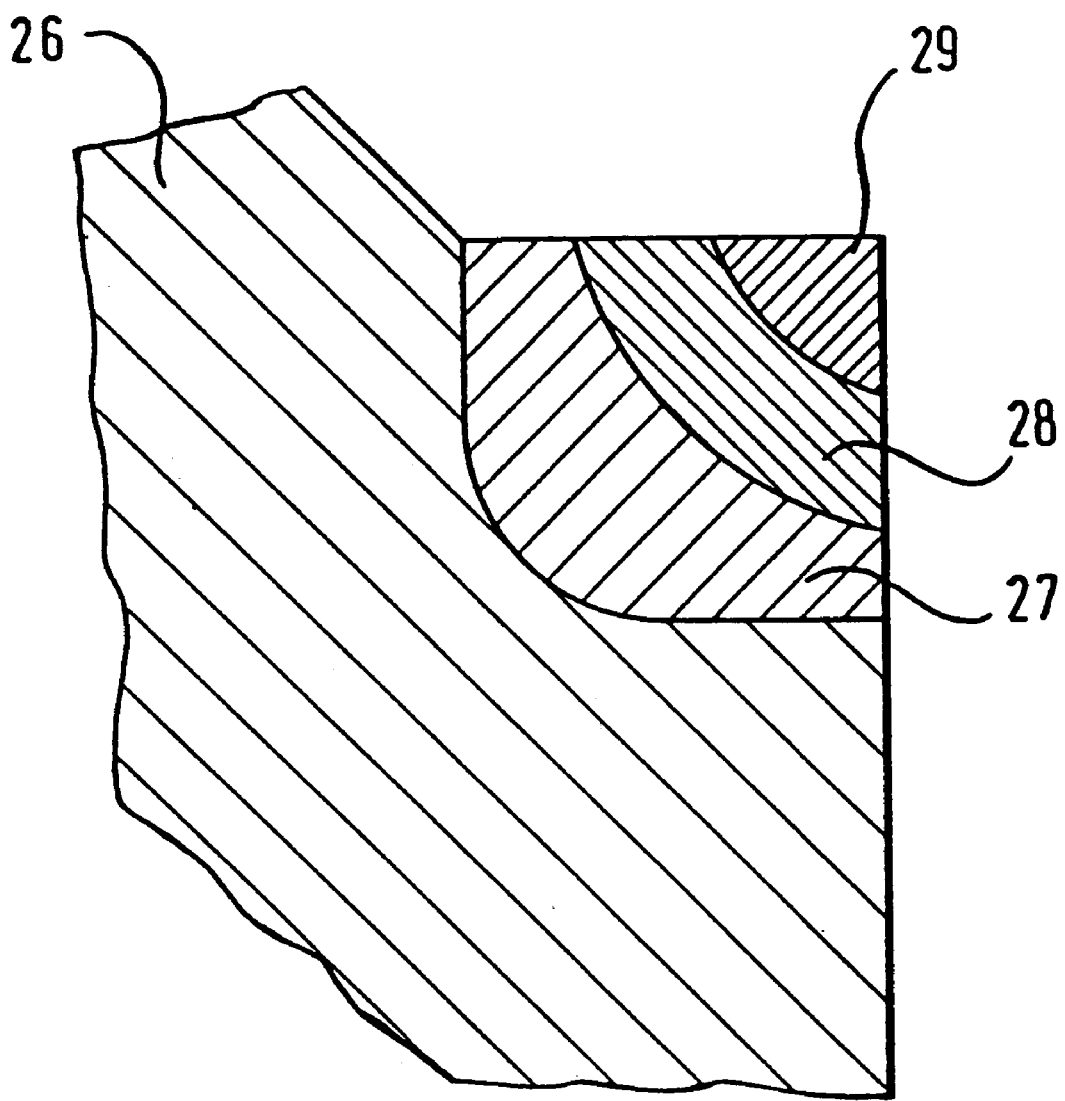

United States Patent [19]
Ostermeyer

[11] Patent Number: 5,946,830
[45] Date of Patent: *Sep. 7, 1999

[54] CONCRETE CRUSHING TONGS

[75] Inventor: Thomas Ostermeyer, Biberach, Germany

[73] Assignee: Schilling Ostermeyer Maschinenbau GmbH, Germany

[ * ] Notice: This patent is subject to a terminal disclaimer.

[21] Appl. No.: 09/175,296

[22] Filed: Oct. 20, 1998

Related U.S. Application Data

[63] Continuation of application No. 08/765,519, filed as application No. PCT/EP95/01191, Mar. 30, 1995, Pat. No. 5,822,893.

[30] Foreign Application Priority Data

Jul. 13, 1994 [DE] Germany ............... 44 24 740

[51] Int. Cl.⁶ .................................................. E02F 3/96
[52] U.S. Cl. .................................. 37/406; 30/134
[58] Field of Search ................ 30/90, 92, 180, 30/134, 228; 241/101.73, 264, 266; 414/740; 37/403, 404, 406

[56] References Cited

U.S. PATENT DOCUMENTS

| | | |
|---|---|---|
| 4,519,135 | 5/1985 | LaBounty . |
| 4,558,515 | 12/1985 | LaBounty . |
| 4,771,540 | 9/1988 | LaBounty . |
| 5,060,378 | 10/1991 | LaBounty et al. . |
| 5,183,216 | 2/1993 | Wack . |

FOREIGN PATENT DOCUMENTS

| | | |
|---|---|---|
| 320 445 | of 0000 | European Pat. Off. . |
| 137 693 | 1/1988 | European Pat. Off. . |
| 634 242 | 1/1995 | European Pat. Off. . |
| 33 32 022 | 3/1984 | Germany . |
| 36 18 191 | 12/1987 | Germany . |
| 39 23 173 | 2/1990 | Germany . |
| 40 13 126 | 10/1991 | Germany . |
| 42 01 582 | 10/1992 | Germany . |

Primary Examiner—Robert E. Pezzuto
Attorney, Agent, or Firm—Quarles & Brady

[57] ABSTRACT

Concrete crushing tongs comprise a frame-shaped first jaw of tongs (1) and a second jaw of tongs (2) which is connected to the first jaw of tongs (1) at a pivot joint (3). The two jaws of tongs (1, 2) each comprise concrete crushing portions (13, 18) with projections (14, 19). The concrete crushing portions (13, 18) of both jaws of tongs (1, 2) each project beyond cutting edges (11, 17) of the two jaws of tongs (1, 2) in a direction towards the corresponding other jaw of tongs (2, 1). Thus, the concrete crushing function of the concrete crushing tongs is separated from the function of cutting the reinforcement.

23 Claims, 6 Drawing Sheets

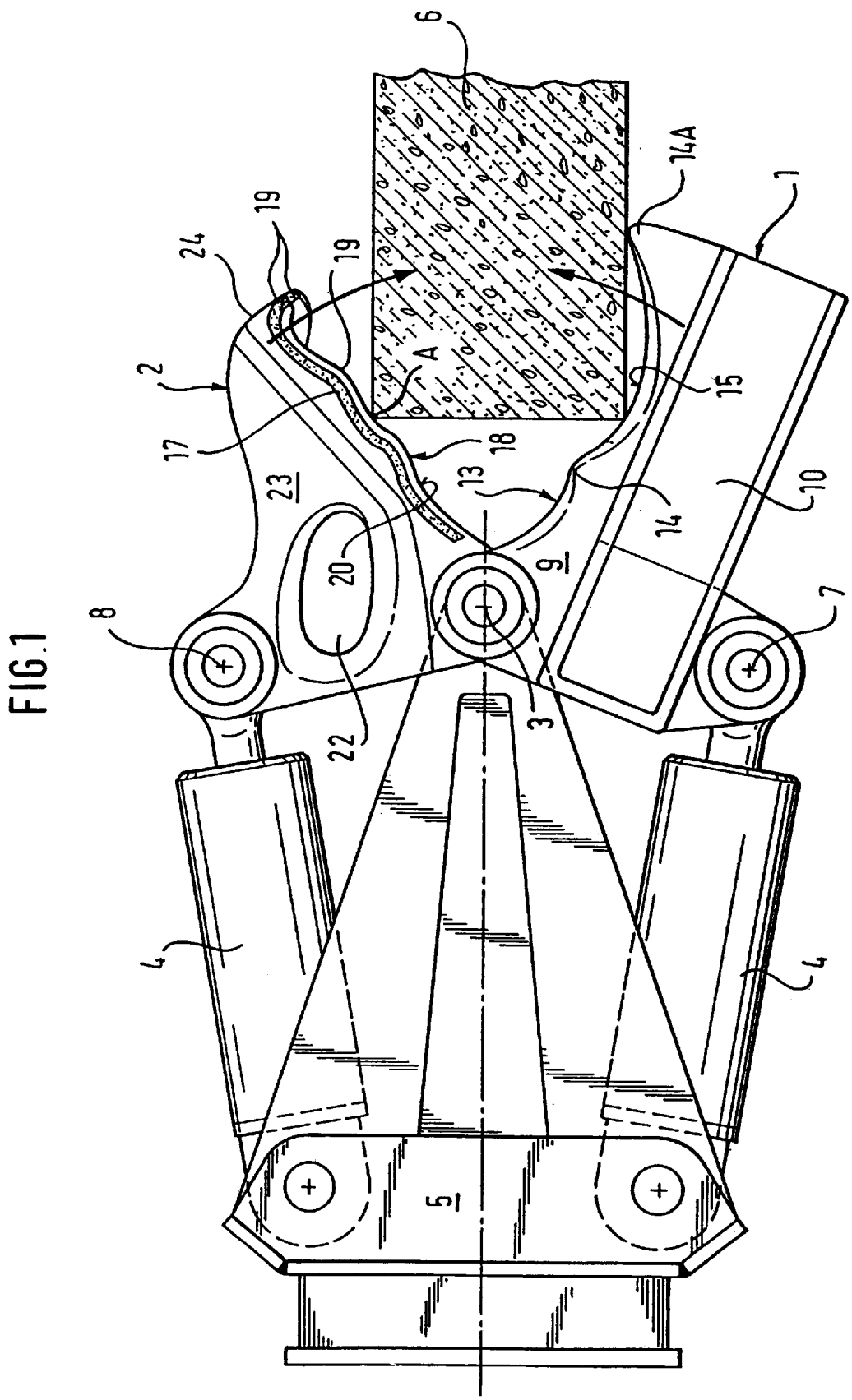

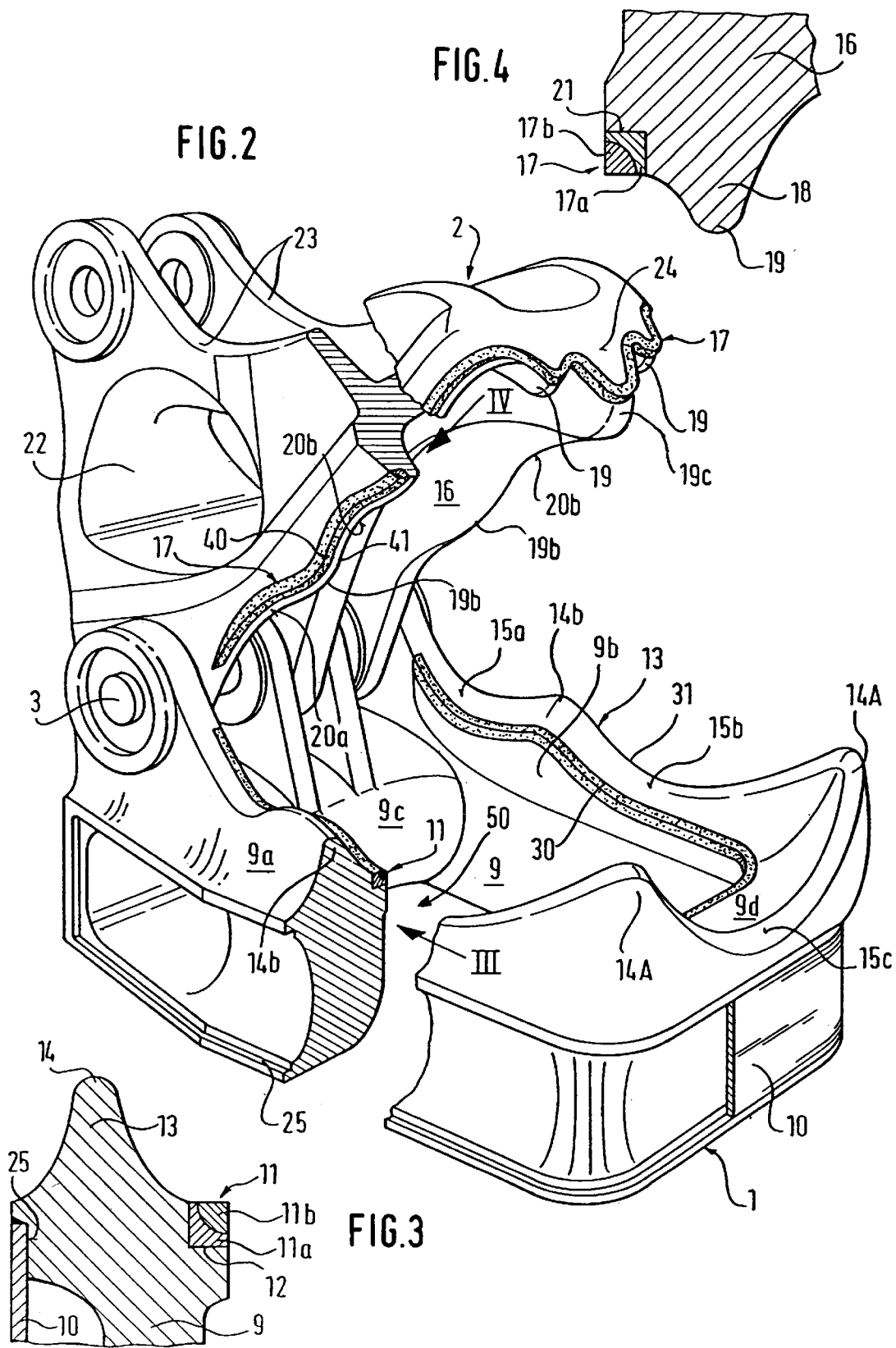

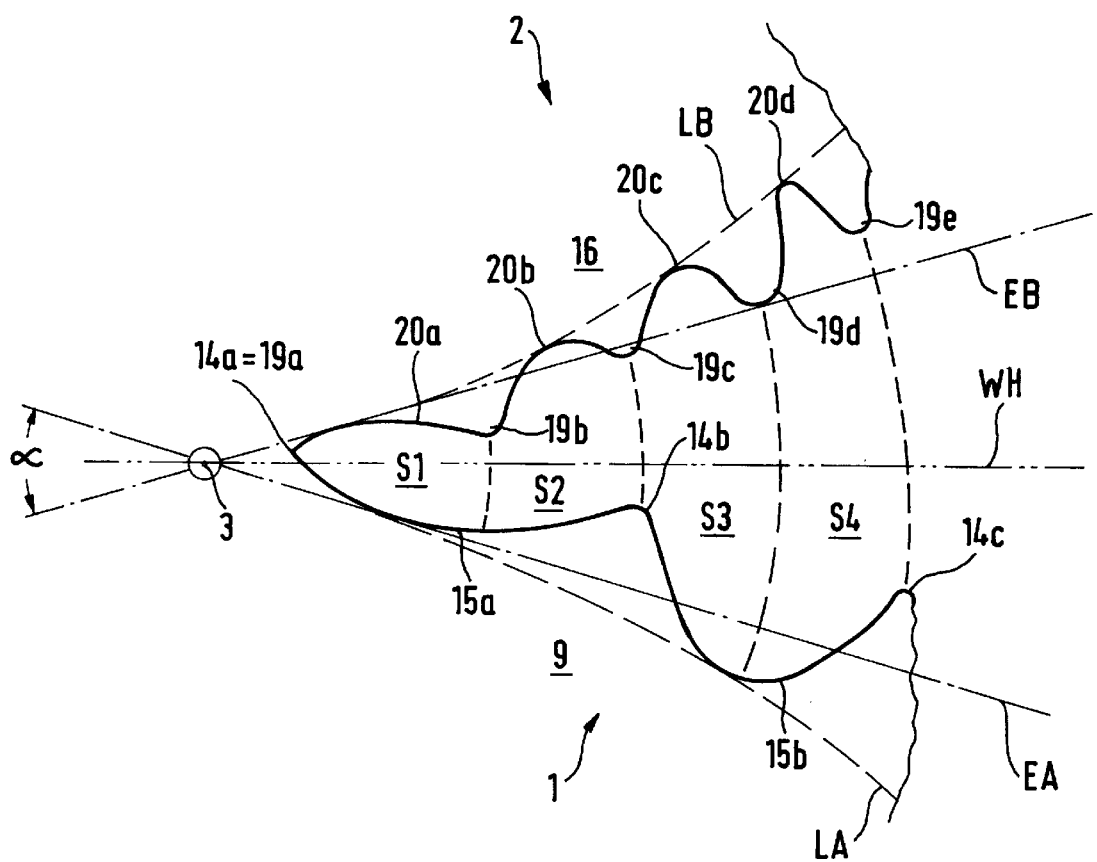

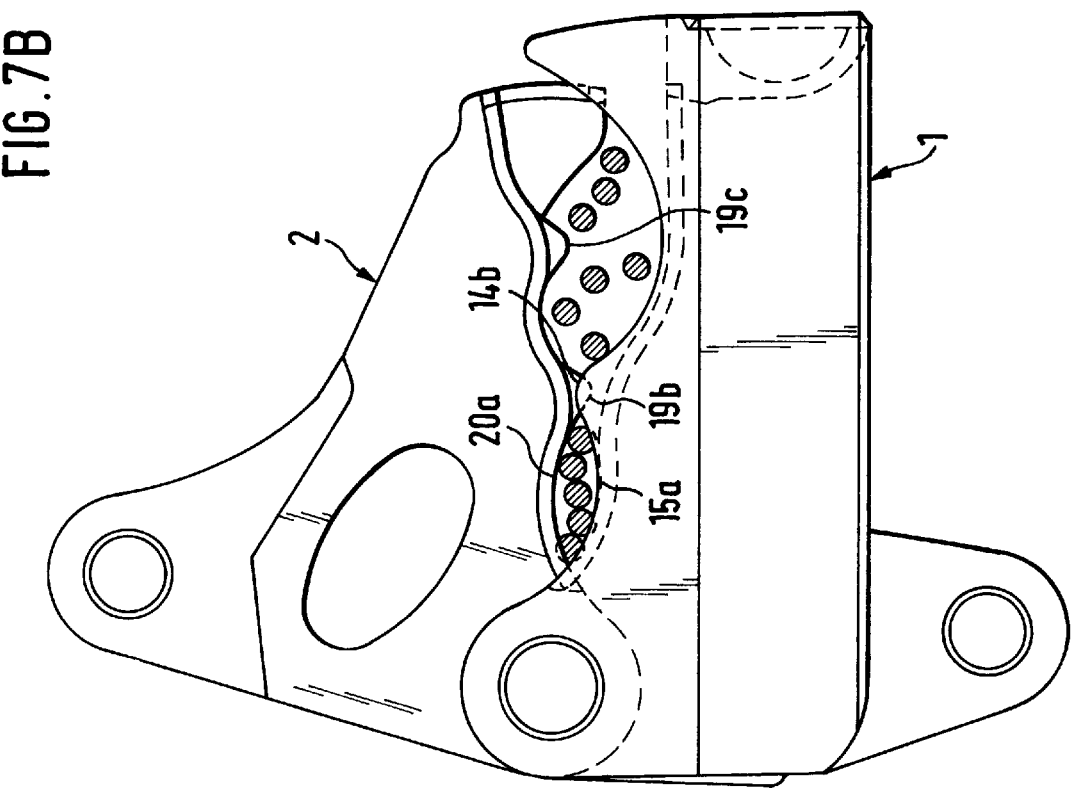
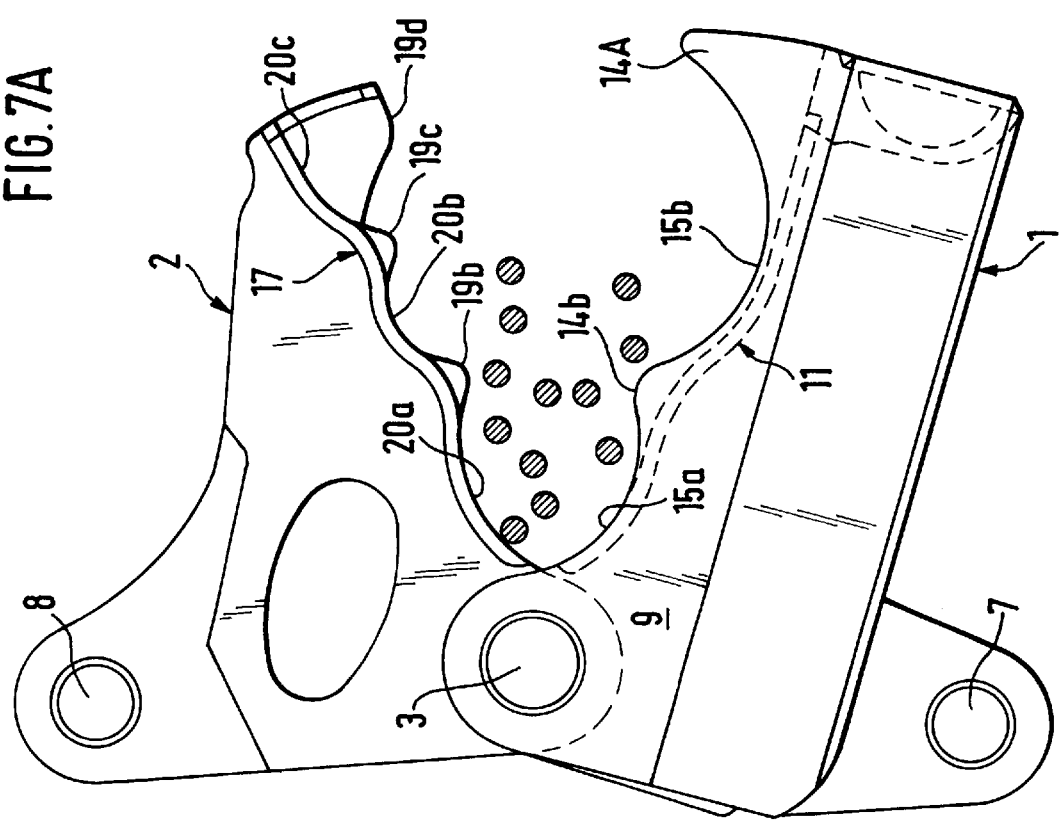

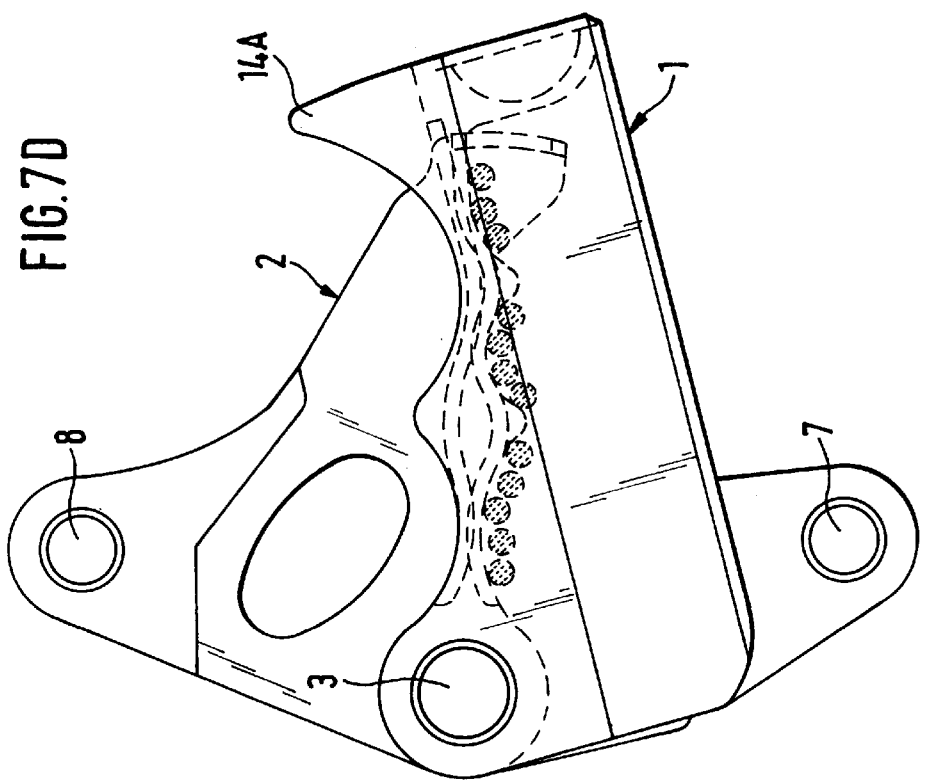
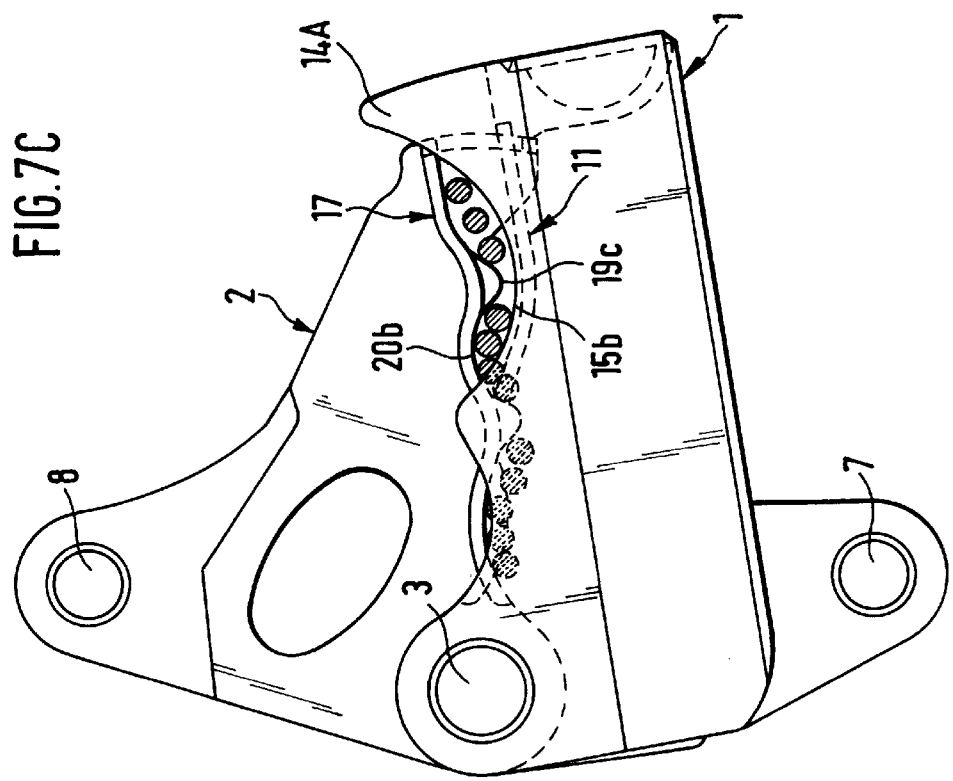

CONCRETE CRUSHING TONGS

This application is a continuation application of application Ser. No. 08/765,519, now U.S. Pat. No. 5,822,893, filed on Jan. 3, 1997, which is a PCT EP95/01191 filed Mar. 30, 1995. The invention relates to concrete crushing tongs.

The DE 36 18 191 C2 discloses concrete crushing tongs comprising first and second jaws which are pivotly connected to each other at a joint, the first jaw having a frame-shaped base body surrounding an interior space, the first and second jaws each having a cutting device with a cutting edge and a concrete crushing portion projecting beyond the corresponding cutting edge toward the other jaw, and the second jaw entering the interior space during a cutting operation and pushing, in operation, the crushed material through the interior space. The DE 40 13 126 A1 discloses concrete crushing tongs having a stationary first jaw which is formed as frame, and a second jaw which is connected to the first jaw through a pivot joint, the first and second jaws each comprising a cutting means with a plurality of cutting edges and a concrete crushing portion which projects beyond the corresponding cutting edges in direction towards the other jaw, wherein, in operation, first the two concrete crushing portions cooperate for crushing the concrete and thereafter the cutting edges cooperate for cutting the reinforcement.

The known concrete crushing tongs are problematic because of the risk of crushed material getting jammed in the jaws, thereby causing a work interruption and/or an increased wear of the movable or crushing and cutting, resp., parts of the concrete crushing tongs because of the arising distortion forces, further because of the substantially undefined distribution of the reinforcement rods for cutting and of the resulting risk of concrete crushing tongs being blocked by pinched reinforcement rods or of vastly varying cutting clearances and increased wear of the cutting edges resulting therefrom.

It is an object of the invention to provide concrete crushing tongs, wherein the concrete crushing function and the cutting functions are separate and the reliability is increased.

This object is achieved by concrete crushing tongs according to claim 1 or 6 or 10.

With these concrete crushing tongs small variations of cutting clearance are obtained by an increased stability of the first jaw of tongs and a separation of the concrete crushing function from the cutting of the reinforcement by forming the concrete crushing portion of each jaw of tongs to project beyond its cutting edge towards the respective other jaw of tongs, whereby the concrete is essentially crushed before the cutting edges of both jaws cut the reinforcement. Hence, the wear of the cutting edges caused by the high hardness of the quartzes and silicates contained in the concrete in case that the cutting edges substantially participate in the operation of concrete crushing is reduced. The cutting edges may therefore be made of a material which is especially suited for the cutting operation in a form adapted to this cutting operation, whereas the concrete crushing portions can be adapted to the concrete crushing operation. The enlarging interior space prevents the crushed material from jamming within the first jaw of tongs.

Further embodiments of the inventions are defined in the subclaims.

An improved fanning out of the reinforcement and a sequential cutting of the reinforcement is obtained by the particular arrangement of the noses and concave portions.

Further features and advantages of the invention will be apparent from the description of embodiments. In the Figures:

FIG. 1 is a side view of a first embodiment of concrete crushing tongs with a concrete block being schematically shown between the jaw tongs, FIG. 2 is a perspective view of the first embodiment, FIG. 3 is a sectional view of the cutting edge of the first jaw of tongs and of its environment in direction of arrow III of FIG. 2, FIG. 4 is a sectional view of the cutting edge of the second jaw of tongs and of its environment in direction of arrow IV of FIG. 2, FIG. 5 is a sectional view of a further embodiment of the cutting edge, FIG. 6 shows the principle of an improved fanning out of the reinforcement, and FIGS. 7A–D is a side view of a second embodiment showing the principle of fanning out and successive cutting of the reinforcement in four representations with decreasing aperture angle between the jaws of tongs.

FIG. 1 is a side view of an embodiment of the concrete crushing tongs. The concrete crushing tongs comprise a first jaw of tongs 1, which is formed as a frame (as shown in FIG. 2) and a second jaw of tongs 2 which is connected to the first jaw of tongs through a pivot joint 3. A respective one end of lifting cylinders 4 is connected to a coupling piece 5. The coupling piece 5 serves for coupling the concrete crushing tongs to an appliance carrier such as the swivel arm of a digger or the like. The respective other end of the lifting cylinders 4 is connected to a link point 7 of the first jaw of tongs 1 or to a link point 8 of the second jaw of tongs 2. By operation of the lifting cylinders 4 to increase the distance between their ends the jaws of tongs 1, 2 pivot at the joint 3 in direction of the arrows shown in FIG. 1. A concrete block 6 which is schematically shown in FIG. 1 is crushed by this pivoting or clamping movement of the jaw of tongs 1, 2. The crushed material, i.e. the crushed concrete and the cut reinforcement, is pushed through the frame-shaped first jaw of tongs 1 by the pivoting movement of the jaw of tongs 1, 2 when crushing and cutting. The crushed material is discharged at the lower side of the first jaw of tongs 1, i.e. at the side of the first jaw of tongs 1 facing away from second jaw of tongs 2.

In FIG. 2 the embodiment of the concrete crushing tongs is shown in perspective representation. The first jaw of tongs 1 comprises a base body 9 which is a casting in this embodiment. The frame-shaped base body 9 comprises two side portions 9a, 9b, a joint-side portion 9c and a front portion 9d opposite to the joint-side portion, the portions surrounding and defining a funnel-shaped interior space 50. The interior space 50 is open towards the upper side, i.e. the side of the first jaw of tongs 1 facing the second jaw of tongs 2, and towards the bottom side of the first jaw of tongs 1. The interior space 50 flares out from the upper side towards the bottom side so that it is defined by a funnel-shaped inner wall of the first jaw of tongs 1. As shown in the sectional view of the side portion 9a in FIG. 2 the portions 9a to 9d of the base body 9 have a substantially C-shaped cross-section. In the joint-side portion 9c the substantially C-shaped cross-section is further developed to form an O-shaped cross-section, as shown in FIG. 2, so that the joint-side portion 9c works as a torsion box which transfers the incoming forces from the lifting cylinder 4 connected to the first jaw of tongs 1 to the side portions 9a, 9b. The C-shaped cross-section provides for saving of weight, material and costs while increasing the rigidity of the frame-shaped base body 9.

In the present embodiment of the concrete crushing tongs the rigidity is further increased by forming a bezel 25 around the base body 9 at the free ends of the legs of the C-shaped cross-section so that plates 10 are inserted into this bezel and welded to the base body to transform the C-shaped cross-section to a closed D-shaped cross-section (box profile) which allows to further increase the rigidity. In FIG. 2 such a plate 10 is shown at the front portion 9d and FIG. 1 shows the concrete crushing tongs in a state ready for operation whereby the plates 10 completely cover the C-shaped recesses of the base body 9.

The first jaw of tongs 1 has a cutting edge 11 provided at the upper side of its base body 9 and extending along the inner side of the side portions 9a, 9b and of the front portion 9d facing the funnel-shaped interior space 50. The cutting edge 11 is received by a cutter bed 12. A continuous concrete crushing portion 13 is formed on the side portions 9a, 9b and on the front portion 9d at the upper side of the base body 9 of the first jaw of tongs 1 facing the second jaw of tongs 2. The concrete crushing portion 13 projects beyond the cutting edge 11 towards the second jaw of tongs 2. In this embodiment a first plane is defined by the pivot axis of the joint 3 and any point 30 of the cutting edge 11 of the first jaw of tongs 1 and all points (but at least one point 31) of the concrete crushing portion 13 of the first jaw of tongs 1 lying in a second plane which is parallel to the pivot axis 3 of the joint 3, perpendicular to the first plane and extends through the point 30 of the cutting edge 11, and facing the second jaw of tongs 2, are arranged in front of the first plane in direction of the pivot movement towards the second jaw of tongs 2.

At each side portion 9a, 9b the concrete crushing portion 13 of the first jaw of tongs 1 has respective two concave portions 15 which are connected with a steady curvature through a nose 14 which will be defined as tooth 14 in the following. In this embodiment a projection or tooth 14A which far extends in direction towards the second jaw of tongs 2 is formed in the concrete crushing portion 13 at the connection of the side portions 9a, 9b with the front portion 9d. The teeth 14A are shell-shaped to form a convex curvature at the outer side of the frame. A concave portion 15c is formed between the two teeth 14A. The shape of the concrete crushing portion 13 is adapted to the shape resulting from abrasion during the concrete crushing process. This means that the inner sides as well as the outer sides of the concrete crushing portion are of rounded form.

The rounded form of the concrete crushing portion 13 or of the teeth 14 and of the concave portions 15, resp., reduces the wear of the concrete crushing portion in the crushing process. Owing to the funnel-shaped form of the base body 9 which flares out at its side facing away from the second jaw of tongs crushed concrete pieces and the cut reinforcement pieces do not get jammed at the inner side of the frame-shaped base body 9 and may therefore be easily discharged or pushed out in a direction of the side of the first jaw of tongs 1 facing away from the second jaw of tongs 2. This ensures that the operation is not interrupted by material which is jammed or blocked in the frame-shaped first jaw of tongs 1. Thus, the crushed concrete pieces and cut reinforcement pieces can be continuously discharged in a single operation.

The second jaw of tongs 2 has a base body 16 which is a casting in this embodiment of the concrete crushing tongs. The base body 16 of the second jaw of tongs 2 is connected to the base body 9 of the first jaw of tongs 1 through the pivot joint 3. The base body 16 is formed to dip into the frame-shaped base body 9 of the first jaw of tongs 1 during the pivot movement for concrete crushing and reinforcement cutting, whereby the side of the base body 16 facing the first jaw of tongs 1 has a closed first surface. A cutting edge 17 is formed at the edge of the first surface of the base body 16 of the second jaw of tongs 2. The base body 16 has a concrete crushing portion 18 which is formed on the first surface and projects beyond the cutting edge 17 in direction towards the first jaw of tongs 1. In this embodiment a third plane is defined by the pivot axis of the joint 3 and any point 40 of the cutting edge 17 of the second jaw of tongs 2 and all points (but at least one point 41) of the concrete crushing portion 18 of the second jaw of tongs 2 lying in a fourth plane which is parallel to the pivot axis 3 of the joint 3 and perpendicular to the third plane and extends through the point 40 of the cutting edge 17, and facing the first jaw of tongs 1, are arranged in front of the third plane in direction of the pivot movement towards the first jaw of tongs 1.

In a manner similar to the concrete crushing portion 13 the concrete crushing portion 18 comprises noses or teeth 19 and concave portions 20, whereby the base body 16 has three concave portions 20 which are each interconnected by a respective tooth 19 with a steady curvature at each of the portions of the concrete crushing portion 18 opposite to the side portions 9a, 9b of the first jaw of tongs 1, and whereby the base body 16 has three teeth 19 connected by respective concave portions 20 with a steady curvature at its front side 24 opposite to the joint. The center one of the three teeth projects further towards the first jaw of tongs 1 than the two adjacent teeth. The cutting edge 17 is received in a cutter bed 21 which is formed at the outer side of the base body 16 (i.e. at the edge of the first surface) opposite to the first jaw of tongs 1.

As best shown in FIG. 1 the first jaw of tongs 1 and the second jaw of tongs 2 swing around the joint 3 in direction of the arrows shown in FIG. 1 when the lifting cylinders 4 are operated to increase the distance between their ends. A concrete piece 6 to be crushed is crushed by the concrete crushing portion 13 with the teeth 14 and the concave portions 15 of the first jaw of tongs 1 and by the concrete crushing portion 18 with the teeth 19 and the concave portions 20 of the second jaw of tongs 2. As can be readily seen in the side view of FIG. 1 the cutting edge 17 of the second jaw of tongs 2 does not engage the concrete part 6 for crushing the same. If at all, the cutting edge 17 engages pieces of the concrete part 6 which are already substantially crushed and adhere to the reinforcement. Similarly, the cutting edge 11 of the first jaw of tongs 1 does not engage the concrete part 6 for crushing thereof. Again, the cutting edge 11 of the first jaw of tongs 1, lying behind the concrete crushing portion 13 with respect to the concrete part 6, only engages, as best shown in the sectional view of FIG. 2 and FIG. 3, already crushed pieces of the concrete part 6 which are pushed out through the frame-shaped base body 9 and more specifically through its funnel-shaped interior space 50 by the movement of the jaw of tongs 2. In the present embodiment this effect is obtained by the above-described arrangement of the cutting edges and of the concrete crushing portions.

When the concrete is substantially crushed, the reinforcement is fanned out by the arrangement of the teeth 14, 19 and of the concave portions 15, 20 and cut by the cooperating cutting edges 11, 17 during the further pivoting movement of the jaw of tongs around the joint 3. During the pivoting movement the already crushed material is continuously pushed through the funnel-shaped interior space 50 of the first jaw of tongs 1 and discharged at the bottom side thereof. The continuous material discharge enabled by the funnel-shaped interior space 50 ensures that jamming crushed material does not interfere with the fanning out and cutting of the reinforcement which is described in more detail below.

In the following the cutting of the reinforcement will be described. When pivoting the jaw of tongs 1, 2 around the joint 3 the portions of the reinforcement extending parallel to the axis of the joint 3 are fanned out by the teeth and concave portions formed on the side portions 9a, 9b and on the base body 16, and the parts of the reinforcement extending perpendicular to the axis of the joint 3 are fanned out by the teeth and concave portions formed on the front portion 9d and on the front portion of the base body 16. This fanning out divides the individual parts or rods or wires, resp., of the reinforcement into bundles which are cut in different steps of the pivoting movement, because the cutting edges 11 and 17 do not cut at the same time over their entire length during their pivoting movement around the joint 3. Thus, the teeth and concave portions of the concrete crushing portions 13, 18 not only allow to exert a selective high force onto the concrete to be crushed, but also facilitate at the same time the cutting of the reinforcement by their fanning out effect.

The shape of the base body 16 of the second jaw of tongs 2 is adapted to the forces occurring when crushing the concrete and cutting the reinforcement. As best seen in the side view of FIG. 1 forces act upon the base body 16 at essentially three points when crushing concrete. These points are the joint 3, the link point 8 and a point of contact A between the base body 16 and the concrete part 6. Respective tensile forces act between the joint 3 and the link point 8 or the point of contact A, resp., while a compressive force acts between the link point 8 and the point of contact A. As may be readily seen in FIG. 1, the lines of action of these forces extend entirely through the material of the base body 16. The hole 22 which is shown in FIGS. 1 and 2 and has a substantially O-shaped cross-section does not substantially intersect these lines of action. The forces occurring when crushing concrete and cutting the reinforcement act upon the base body 16 through the concrete crushing portion 18 and the cutting edge 17. The base body 16 is formed to have two parallel plate-shaped portions 23 of the base body 16 in the plane of the pivoting movement around the joint 3 behind the concrete crushing portion 18 and the cutting edge 17 in direction of the side facing away from the jaw of tongs 1. These plate-shaped portions 23 also extend along the line of action of the acting compressive force. Owing to this design the base body 16 has a high dimensional stability while saving weight, material and costs.

The improved dimensional stability of the frame-shaped base body 9 of the first jaw of tongs 1 and of the base body 16 of the second jaw of tongs 2 results in a further reduction of the cutting wear. The enormous forces occurring when crushing concrete and cutting reinforcement result in deformations of the jaw of tongs, thereby changing the cutting clearance between the cutting edges 11 and 17 when cutting the reinforcement. Such a change results in an increased wear of the cutting edges. Since the dimensional stability of the jaw of tongs 1, 2 of the concrete crushing tongs is very high, no or only slight variations of the cutting clearance occur when cutting the reinforcement.

Owing to the above-described design of the concrete crushing portions 13, 18 and of the cutting edges 11, 17 of the jaw of tongs the function of concrete crushing is separated from the function of cutting the reinforcement. The base bodies 9, 16 of the first and second jaw of tongs 1, 2 are formed as castings made of tempered cast steel. The hardness of the tempered steel castings 9, 16 is about 400 to 450 HV (Vickers Hardness). The quartzes and silicates in the concrete have a hardness of about 800 HV. Thus, the concrete crushing portions 13, 18 of the base bodies 9, 16 are further hardened for improving the wear resistance. In the described embodiments the concrete crushing portions are hardened by welding at least one layer of a material having HV≧700 thereon. According to another embodiment several layers of materials with increasing hardness are welded one after the other onto the crushing portions 13, 18 so that the crushing forces are transferred to the casting in a more uniform manner and the applied layer does not chip off. For example, a first layer (buffer layer) of chromium having a hardness of 500 HV and a thickness of about 2–3 mm and thereafter a second layer of tungsten carbide in a chromium matrix with a hardness of 700 HV and a thickness of about 4 mm is applied. Generally, metal carbides and in particular chromium, niobium, tungsten carbides or the like are suitable materials for such layers which may also consist of more than two layers. According to a further embodiment the uppermost layer of such a hardening treatment of the concrete crushing portions may have a hardness of more than 800 HV.

On the one hand the hardness of the cutting edges is required to be as high as possible for obtaining sufficient wear resistance, on the other hand a sufficient tenacity of the material is required for discharging the high forces occurring when cutting the reinforcement. The embodiments of the concrete crushing tongs therefore use cutting edges having a hardness of 500–600 HV, usually about 550 HV. In order to enable a good transfer of the occurring high cutting forces into the base bodies 9 and 16, resp., through the cutter beds 12, 21 the cutting edges of a further embodiment are constructed in a multi-layered manner. In this embodiment shown in section in FIGS. 3 and 4 the construction of the cutting edge is double-layered. A first layer 11a, 17a (coupling agent and supporting layer) having a hardness of about 500 HV is welded onto the cutting bed of the casting 9, 16 which has a hardness of about 400–450 HV, and the cutting edge 11b, 17b having a hardness of about 550 HV is welded onto this first layer. These welded layers are then aftertreated for forming the cutting edge.

A further embodiment of the cutting edge is shown in FIG. 5 wherein the cutter bed has a rounded shape and the cutting edge is welded thereon in a three-layered construction. A first layer (bonding agent 27) having a hardness of 450–500 HV is applied to the base material 26, i.e. the casting, having a hardness of about 400–450 HV, a second layer (supporting layer 28) having a hardness of 500–550 HV is applied to the first layer and the cutting edge 29 having a hardness of about 550 HV is applied to the supporting layer.

The above-described cutting edges can not loosen and exhibit higher service lives independently of the separation of the concrete crushing portions and the cutting edges, because the cutting forces are transferred to the base material in a very uniform manner. Furthermore, the material of the cutting edges can be renewed or repaired and reworked, resp., by welding on so that the cutting edges can be serviced at a relatively low expense.

As shown in FIG. 1 the frame-shaped base body 9 is rounded at the corners of its inner side so that firstly a reduced wear occurs in these corners and secondly the forces distorting the base body are smaller when the crushed material, i.e. the crushed concrete and the cut reinforcement pieces, resp., are pressed through. Thus, a further increased dimensional stability of the base body 9 of the first jaw of tongs 1 is obtained in addition to the already described shape of the frame with enlarging cross-section of the enclosed space and to the already described C-shape of the cross-section.

As again best shown in FIG. 1 the form of the first jaw of tongs 1 is adapted to the triangle of forces occurring when crushing the concrete and cutting the reinforcement between the joint 3, the link point 7 and the point or points of contact between the first jaw of tongs 1 and the concrete part 6. Although the O-shaped hole within the joint-side portion 9c of the base body 9 is concealed in FIG. 1 by the plate 10 it is clearly evident also from FIG. 1 that the material of the base body 9 substantially extends along the lines of action of the occurring forces.

The principle of an improved fanning out of the reinforcement will be explained with reference to the elementary representation of FIG. 6.

In FIG. 6 the base bodies 9, 16 of the first and second jaw of tongs 1, 2 are schematically represented with corresponding projections 14a to 14c and 19a to 19e, resp., and the corresponding concave portions 20a to 20d and 15a and 15b, resp., in a side view. The concrete crushing portions of the first and second jaw of tongs are formed symmetric with respect to a plane extending perpendicular to the axis of the joint 3 and centrally through the jaw of tongs, as clearly shown in FIG. 2. Thus, projections 14a–c, 19a–e and concave portions 15a–b, 20a–d are formed corresponding to the projections 14a–c, 19a–e and to the concave portions 15a–b, 20a–d shown in FIG. 6 on the symmetric other half (not shown in FIG. 6) of the jaws of tongs 1, 2.

Since the force acting on the link points 7, 8 is substantially constant over the entire pivoting movement of the jaws of tongs 1, 2, it is necessary, for obtainig a uniform cutting performance along the entire length of the portions of the cutting edges 11, 17 extending perpendicular to the axis of the joint 3 (FIGS. 1, 7), that the number of reinforcements (reinforcement strings) which are to be substantially simultaneously cut is inversely proportional to the distance from the joint axis because of the inverse proportional relation between the increasing distance from the axis of the joint 3 and the cutting force acting on the cutting edges 11, 17, following the law of levers.

As shown in FIG. 6 such a fanning out and uniform cutting performance is obtained in principle by, at least for one of the two jaws of tongs 1, 2 (it is shown for both jaws in FIG. 6), the distance of the deepest points of the concave portions 15 and 20, resp., of a jaw 1 or 2 from a plane or tangent which extends through the joint 3 and the deepest points of that concave portion 15a or 20a of a jaw 1 or 2 which is closest to the joint 3, in a direction away from the respective other second jaw of tongs 2 or 1 increases with increasing distance of the concave portions from the joint 3. In FIG. 6 the corresponding plane for the first jaw of tongs is represented by the alternating long and short lines defining the tangent EA, whereas the corresponding plane for the second jaw of tongs is represented by the dot-and-dash tangent EB. The deepest points of the concave portions 15a and 15b of the first jaw of tongs 1 lie on the broken line (envelope) defined as LA and the deepest point of the concave portions 20a to 20d of the second jaw of tongs 2 lie on the broken line (envelope) defined as LB. As shown in FIG. 6 the distance of the deepest points from the corresponding planes preferably does not increase in a proportional manner with increasing distance from the joint 3, but with a growing gradient. This is represented in FIG. 6 by the curvature of the lines LA, LB.

Using a more general expression an envelope which extends through the axis of the joint 3 and is tangent to the concave portions 15 of the first jaw of tongs 1, as represented by the line LA in FIG. 6, in crushing tongs having any aperture angle between the tangents EA, EB has a distance from the bisecting line WH of the aperture angle which is greater, i.e. increases, with increasing distance from the axis of the joint 3 in a direction perpendicular to the axis of the joint. The same situation applies to the envelope through the axis of the joint 3 which is represented by LB in FIG. 6 and is tangent to the concave portions 20 of the second jaw of tongs 2, and which for crushing tongs with any aperture angle between the tangents EA, EB also has a distance from the bisecting line WH of the aperture angle which is greater, i.e. increases, with increasing distance from the axis of the joint 3 in a direction perpendicular to the axis of the joint.

As represented in FIG. 6 by the broken lines indicating the movement of the projections 19b to 19e when closing the tongs, the space between the open jaws of tongs is divided into sectors (in the following referred to as cutting sectors) by the pivoting movement. In FIG. 6 the point where the concrete crushing portion of the first jaw of tongs intersects with the concrete crushing portion of the second jaw of tongs in the view of FIG. 6 is provided with the reference sign 14a=19a, because this point of intersection acts as a projection for fanning off and cutting the reinforcement. As may be clearly seen in FIG. 6 the cutting sectors which are defined by S1 to S4 are each defined by at least two projections arranged at the same jaw of tongs and by respective two concave portions at each of the jaws of tongs. The cutting sector S1 has the two projections 19b and the two concave portions 20a of the second jaw of tongs and the two concave portions 15a of the first jaw of tongs (only one being shown in the side view of FIG. 6 in each case). The cutting sector S2 has the four projections 19b, 19c and the two concave portions 20b at the second jaw of tongs and the two teeth 14b and the concave portion 15 of the first jaw of tongs.

Owing to the above-described arrangement of the deepest points corresponding to the lines LA and LB, resp., or of the steady curvature of the concave portions 15 and 20, resp., the reinforcement strings lying in a cutting sector closer to the joint 3 are cut before cutting the reinforcement strings lying in an adjacent cutting sector having a greater distance from the joint 3. This means that the reinforcement strings are successively cut during the closing movement of the tongs. As explained above this requires that at least one of the jaws of tongs has this arrangement of the concave portions, whereas the corresponding envelope of the other jaw of tongs may also be e.g. a straight line corresponding to the tangent EA or EB, resp., or may have a distance from the bisecting line which decreases with corresponding distance from the axis of the joint. However, in this case the decrease of the distance from the bisecting line must be smaller than the increase of the other envelope in order to ensure a successive cutting of the reinforcements. Thus, the intersection of both envelopes must have a distance from the axis of the joint 3 which increases with decreasing aperture angle.

Furthermore, the concave portions are formed with a steady curvature so that the reinforcement strings extending substantially parallel to the axis of the joint 3 are aligned, when the aperture angle decreases, between the two jaws of tongs in a side-by-side arrangement in a direction perpendicular to the axis of the joint 3. Those reinforcement strings which can not be aligned side-by-side in the direction perpendicular to the axis of the joint 3 are successively pushed to the next adjacent cutting sector. In this manner substantially only such a number of reinforcement strings is cut in one cutting sector which corresponds to roughly the length of a concave portion defining the cutting sector divided by the diameter of the reinforcement strings. In order to obtain a decrease of the number of reinforcement strings to be cut substantially simultaneously in one cutting sector with increasing distance of the cutting sectors from the axis of the joint 3 the projections are arranged at at least one jaw of tongs (the second jaw of tongs 2 with the base body 16 in FIG. 6) such that the distance between two adjacent projections, which distance divided by the diameter of the reinforcements determines substantially the number of the reinforcement strings which can be simultaneously cut, is roughly inversely proportional to the distance of the deepest point (the point of contact between the envelope and the concave portion) of the concave portion defined by the two projections from the axis of the joint 3. As a result the number of the reinforcement strings which are about simultaneously cut in one cutting sector is roughly inversely proportional to the distance of the cutting sector from the axis of the joint 3. However, since the cutting force available for the substantially simultaneous cutting of the corresponding number of reinforcement strings in the cutting sector is, corresponding to the law of levers, also substantially inversely proportional to the distance from the axis of the joint 3, the cutting power can be kept substantially constant over the entire cutting process by such an arrangement of the teeth and of the concave portions, and an optimum use is made of the effectively available cutting force over the entire cutting process.

The FIGS. 7A to 7D show, in four figures having a decreasing aperture angle between the two jaws of tongs 1, 2, the successive fanning out and cutting of twelve schematically indicated reinforcement strings when decreasing the aperture angle. The concrete wherein the reinforcement strings are embedded and which is substantially crushed already before the cutting operation, is not shown in the representation of FIGS. 7A to 7D. The uncut state of the twelve reinforcement strings extending about parallel to the axis of the joint 3 is shown by hatching and cut reinforcement strings are shown by broken hatching.

As shown in FIG. 7A eight of the twelve reinforcement strings are initially in the cutting sector S1 defined by the projections 14b and 19b and closest to the axis of the joint 3. When closing the tongs these reinforcement strings are aligned side-by-side in a direction perpendicular to the axis of the joint 3 by the steady curvature of the concave portions 15a, 20a. Thus, as shown in FIG. 7B, with progressing closure only five reinforcement strings aligned side-by-side are to be cut in the cutting sector closest to the axis of the joint 3. The number of the reinforcement strings to be cut corresponds about to the length of the portions of the cutting edges 11, 17 in the cutting sector divided by the diameter of the reinforcement strings. As shown in FIG. 7C the cutting operation of the five first cut reinforcement strings is substantially terminated before the adjacent cutting sector defined by the projections 19b and 19c requires the substantial cutting power. As clearly evident from FIG. 7C a number of four reinforcement strings is cut in the cutting sector defined by the projections 19b and 19c, whereas the remaining three reinforcement strings must be cut in the following adjacent cutting sector. As shown by the still very large distance of the cutting edges 11, 17 from each other in FIG. 7C the three last cut reinforcement strings are cut only after the cutting operation of the four previously cut reinforcement strings is substantially terminated. FIG. 7D shows the situation where the twelve shown reinforcement strings are completely cut.

I claim:

1. Concrete crushing tongs for cutting concrete parts having a reinforcement, said concrete crushing tongs comprising:

first and second jaws; and a pivot joint for hingedly connecting said first and second jaws such that said jaws are movable to open and close relative to each other;

said first jaw having a frame-shaped first base body, including two side portions, a joint-side portion, and a front portion opposite to said joint-side portion, said side portions, joint-side portion and front portion defining an interior space which is formed to flare out in a direction of movement of said second jaw in a closing movement of said jaws toward each other, said first jaw further having a first cutting means comprising a first cutting edge and a first concrete crushing portion projecting beyond said first cutting edge towards said second jaw, said second jaw having a second cutting means comprising a second cutting edge and a second concrete crushing portion projecting beyond said second cutting edge towards said first jaw, whereby when said pivoting means forces said jaws to close together said first and second crushing portions crush said concrete part before said first and second cutting edges cooperate to cut said reinforcement, and said second jaw enters said interior space to push the crushed concrete material therethrough.

2. The concrete crushing tongs of claim 1, wherein said first concrete crushing portion comprises first projections and first concave portions, each first concave portion being positioned between two adjacent first projections, a further first concave portion being positioned along each of the two side portions of the first jaw between said pivot joint and the first projection closest to said pivot joint, whereby a first envelope is defined by the axis of said pivot joint and tangent lines from the axis of said pivot joint to said first concave portions, a first tangent plane is defined by the axis of said pivot joint and a tangent line from the axis of said pivot joint to said further first concave portion, and a distance between said first envelope and said first tangent plane in a direction away from said second jaw increases with increasing distance from said pivot joint.

3. The concrete crushing tongs of claim 2, wherein said second concrete crushing portion comprises second projections and second concave portions, each second concave portion being positioned between two adjacent second projections, and a further second concave portion being positioned along each of lateral portions of said second jaw between said pivot joint and the second projection closest to said pivot joint, whereby a second envelope is defined by the axis of said pivot joint and tangent lines from the axis of said pivot joint to said second concave portions, a second tangent plane is defined by the axis of said pivot joint and a tangent line from the axis of said pivot joint to said further second concave portion, and a distance between said second envelope and said second tangent plane in a direction away from said first jaw increases with increasing distance from said pivot joint.

4. The concrete crushing tongs of claim 1, wherein said second concrete crushing portion comprises second projections and second concave portions, each second concave portion being positioned between two adjacent second projections, and a further second concave portion being positioned along each of lateral portions of said second jaw between said pivot joint and the second projection closest to said pivot joint, whereby a second envelope is defined by the axis of said pivot joint and tangent lines from the axis of said pivot joint to said second concave portions, a second tangent plane is defined by the axis of said pivot joint and a tangent line from the axis of said pivot joint to said further second concave portion, and a distance between said second envelope and said second tangent plane in a direction away from said first jaw increases with increasing distance from said pivot joint.

5. The concrete crushing tongs of claim 3, wherein said first and second concave portions each have a steadily curved shape, whereby, upon closing said jaws together said concave portions and projections cooperate to fan out said reinforcement such that individual reinforcement strings running parallel to the pivot axis are aligned substantially side-by-side in one cutting sector in a direction perpendicular to the pivot axis.

6. The concrete crushing tongs according to claim 1, wherein said first concrete crushing portion is at least partially provided with a hard layer, and said second concrete crushing portion is at least partially provided with a hard layer.

7. The concrete crushing tongs according to claim 1, wherein said first and second cutting edges each have a multi-layered construction, being welded on said first and second jaws, respectively.

8. The concrete crushing tongs according to claim 1, wherein a first plane is defined by the pivot axis and a point on said first cutting edge, a second plane is perpendicular to said first plane and parallel to the pivot axis said second plane further being defined by said point on said first cutting edge, and at least one point on said first concrete crushing portion which lies in said second plane and is directed toward said second jaw, is positioned ahead of said first plane in a direction defined by pivoting movement toward said second jaw, and a third plane is defined by the pivot axis and a point on said second cutting edge, a fourth plane is perpendicular to said third plane and parallel to the pivot axis and defined by said point of said second cutting edge, whereby at least one point on said second concrete crushing portion which lies in said fourth plane and is directed toward said first jaw is positioned ahead of said third plane in a direction defined by pivoting movement toward said first jaw.

9. The concrete crushing tongs according to claim 1, wherein said first and second concave portions and said first and second projections are arranged relative to each other and relative to said first and second cutting edges such that upon closing said jaws together, said second jaw fits into said first jaw, cutting a reinforcement provided in a cutting sector defined by at least two projections of one of the jaws and two corresponding concave portions on either of said jaws, said reinforcement substantially severed before any further reinforcements are cut, as the jaws are closed together.

10. Concrete crushing tongs for cutting concrete parts having a reinforcement, said concrete crushing tongs comprising:

first and second jaws, said first jaw having a frame-shaped first base body defining an interior space; and a pivot joint for hingedly connecting said first and second jaws such that said jaws are movable to open and close relative to each other, whereby when said jaws are moved to close said second jaw enters said interior space;

said first jaw further having a first cutting means comprising a first cutting edge and a first concrete crushing portion projecting beyond said first cutting edge towards said second jaw, said second jaw having a second cutting means comprising a second cutting edge and a second concrete crushing portion projecting beyond said second cutting edge towards said first jaw, said first concrete crushing portion comprising first projections and first concave portions, each first concave portion being positioned between two adjacent first projections, a further first concave portion being positioned along each of two side portions of said first jaw between said pivot joint and the first projection closest to said pivot joint, and said second concrete crushing portion comprising second projections and second concave portions, each second concave portion being positioned between two adjacent second projections, and a further second concave portion being positioned along each of lateral portions of said second jaw between said pivot joint and the second projection closest to said pivot joint, wherein a first tangent plane is defined by the axis of said pivot joint and a tangent line from the axis of said pivot joint to said further first concave portion, a second tangent plane is defined by the axis of said pivot joint and a tangent line from the axis of said pivot joint to said further second concave portion, a first envelope is defined by the axis of said pivot joint and tangent lines from the axis of said pivot joint to said first concave portions, a second envelope is defined by the axis of said pivot joint and tangent lines from the axis of said pivot joint to said second concave portions, and a distance of at least said first tangent plane to said first envelope in a direction away from said second jaw or said second tangent plane to said second envelope in a direction away from said first jaw increases with increasing distance from said pivot joint.

11. The concrete crushing tongs of claim 10, wherein a distance between two adjacent projections of said second projections, which are adjacent in a direction away from said pivot joint, is essentially inverse proportional to a distance of the point of contact of the respective second envelope and the second concave portion positioned between the respective two adjacent second projections from said pivot joint.

12. The concrete crushing tongs of one of according to claim 10, wherein said first and second concave portions each have a steadily curved shape, whereby, upon closing said jaws together, said concave portions and projections cooperate to fan out said reinforcement such that individual reinforcement strings running parallel to the pivot axis are aligned substantially side-by-side in one cutting sector in a direction perpendicular to the pivot axis.

13. The concrete crushing tongs of according to claim 10, wherein said interior space is formed to flare out in a direction of movement of said second jaw in a closing movement of said jaws toward each other.

14. The concrete crushing tongs of claim 10, wherein a distance between two adjacent projections of said first projections, which are adjacent in a direction away from said pivot joint, is essentially inverse proportional to a distance of the point of contact of the respective first envelope and the first concave portion positioned between the respective two adjacent first projections from said pivot joint.

15. The concrete crushing tongs of claim 14, wherein a distance between two adjacent projections of said second projections, which are adjacent in a direction away from said pivot joint, is essentially inverse proportional to a distance of the point of contact of the respective second envelope and the second concave portion positioned between the respective two adjacent second projections from said pivot joint.

16. Concrete crushing tongs for cutting concrete parts having a reinforcement, said concrete crushing tongs comprising:

first and second jaws, said first jaw having a frame-shaped first base body defining an interior space; and a pivot joint for hingedly connecting said first and second jaws such that said jaws are movable to open and close relative to each other, whereby when said jaws are moved to close said second jaw enters said interior space;

said first jaw further having a first cutting means comprising a first cutting edge and a first concrete crushing portion projecting beyond said first cutting edge towards said second jaw, said second jaw having a second cutting means comprising a second cutting edge and a second concrete crushing portion projecting beyond said second cutting edge towards said first jaw, said first concrete crushing portion comprising first projections and first concave portions, each first concave portion being positioned between two adjacent first projections, a further first concave portion being positioned along each of two side portions of said first jaw between said pivot joint and the first projection closest to said pivot joint, and said second concrete crushing portion comprising second projections and second concave portions, each second concave portion being positioned between two adjacent second projections, and a further second concave portion being positioned along each of lateral portions of said second jaw between said pivot joint and the second projection closest to said pivot joint, wherein a first envelope is defined by the axis of said pivot joint and tangent lines from the axis of said pivot joint to said first concave portions, a second envelope is defined by the axis of said pivot joint and tangent lines from the axis of said pivot joint to said second concave portions, and a distance between two adjacent projections of at least said first projections or said second projections, which are adjacent in a direction away from said pivot joint, is essentially inverse proportional to a distance of the point of contact of the respective first or second envelope and the corresponding first or second concave portion positioned between the respective two adjacent first or second projections from said pivot joint.

17. The concrete crushing tongs of claim 16, wherein a first tangent plane is defined by the axis of said pivot joint and a tangent line from the axis of said pivot joint to said further first concave portion, a second tangent plane is defined by the axis of said pivot joint and a tangent line from the axis of said pivot joint to said further second concave portion, and a distance of at least said first tangent plane to said first envelope in a direction away from said second jaw or said second tangent plane to said second envelope in a direction away from said first jaw increases with increasing distance from said pivot joint.

18. The concrete crushing tongs according to claim 16, wherein said first and second concave portions each have a steadily curved shape, whereby, upon closing said jaws together, said concave portions and projections cooperated to fan out said reinforcement such that individual reinforcement strings running parallel to the pivot axis are aligned substantially side-by-side in one cutting sector in a direction perpendicular to the pivot axis.

19. The concrete crushing tongs according to claim 16, wherein said interior space is formed to flare out in a direction of movement of said second jaw in a closing movement of said jaws toward each other.

20. The concrete crushing tongs according to claim 16, wherein said first concrete crushing portion is at least partially provided with a hard layer, and said second concrete crushing portion is at least partially provided with a hard layer.

21. The concrete crushing tongs according to claim 16, wherein said first and second cutting edges each have a multi-layered construction, being welded on said first and second jaws, respectively.

22. The concrete crushing tongs according to claim 16, wherein a first plane is defined by the pivot axis and a point on said first cutting edge, a second plane is perpendicular to said first plane and parallel to the pivot axis said second plane further being defined by said point on said first cutting edge, and at least one point on said first concrete crushing portion which lies in said second plane and is directed toward said second jaw, is positioned ahead of said first plane in a direction defined by pivoting movement toward said second jaw, and a third plane is defined by the pivot axis and a point on said second cutting edge, a fourth plane is perpendicular to said third plane and parallel to the pivor axis and defined by said point of said second cutting edge, whereby at least one point on said second concrete crushing portion which lies in said fourth plane and is directed toward said first jaw is positioned ahead of said third plane in a direction defined by pivoting movement toward said first jaw.

23. The concrete crushing tongs according to claim 16, wherein said first and second concave portions and said first and second projections are arranged relative to each other and relative to said first and second cutting edges such that upon closing said jaws together, said second jaw fits into said first jaw, cutting a reinforcement provided in a cutting sector defined by at least two projections of one of the jaws and two corresponding concave portions on either of said jaws, said reinforcement substantially severed before any further reinforcements are cut, as the jaws are closed together.

\* \* \* \* \*